(12) United States Patent
Ishikawa (10) Patent No.: US 8,634,000 B2
(45) Date of Patent: Jan. 21, 2014

(54) IMAGE PICKUP APPARATUS HAVING AN AUTO ZOOM FUNCTION AND METHOD FOR CONTROLLING IMAGE PICKUP APPARATUS

(75) Inventor: Daisuke Ishikawa, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/150,848

(22) Filed: Jun. 1, 2011

(65) Prior Publication Data
US 2011/0304749 A1 Dec. 15, 2011

(30) Foreign Application Priority Data
Jun. 10, 2010 (JP) ................................. 2010-132958

(51) Int. Cl.
*H04N 5/262* (2006.01)
(52) U.S. Cl.
USPC ........................................................ 348/240.3
(58) Field of Classification Search
USPC ........... 348/240.99, 240.1, 240.2, 240.3, 169, 348/208.14; 382/103
See application file for complete search history.

(56) References Cited

U.S. PATENT DOCUMENTS

| | | | | |
|---|---|---|---|---|
| 4,991,944 A * | 2/1991 | Hirao et al. | ................... | 359/698 |
| 5,434,621 A * | 7/1995 | Yu | ................... | 348/347 |
| 5,812,193 A * | 9/1998 | Tomitaka et al. | ............. | 348/369 |
| 6,967,686 B1* | 11/2005 | Tanaka | ................... | 348/352 |
| 7,868,919 B2* | 1/2011 | Flannery | ................... | 348/211.8 |
| 8,154,626 B2* | 4/2012 | Ohsawa | ................... | 348/240.2 |
| 2002/0127012 A1* | 9/2002 | Okawara | ................... | 396/81 |
| 2003/0025812 A1* | 2/2003 | Slatter | ................... | 348/240.2 |
| 2007/0196084 A1 | 8/2007 | Shibata | | |
| 2009/0051789 A1* | 2/2009 | Ohsawa | ................... | 348/240.2 |

FOREIGN PATENT DOCUMENTS

| | | |
|---|---|---|
| CN | 101021604 A | 8/2007 |
| CN | 101520838 A | 9/2009 |
| EP | 2106127 A2 | 9/2009 |
| JP | 06-153047 | 5/1994 |
| JP | 2003-107335 | 4/2003 |

OTHER PUBLICATIONS

The above references were cited in a Mar. 21, 2013 Chinese Office Action, which is enclosed with English Translation, that issued in Chinese Patent Application No. 201110156626.8.

* cited by examiner

*Primary Examiner* — Nicholas Giles
(74) *Attorney, Agent, or Firm* — Cowan, Liebowitz & Latman, P.C.

(57) ABSTRACT

The image pickup apparatus includes an image production unit producing an image by using an output signal from an image pickup unit, a size detection unit detecting a size of a specific object in the image, a storage unit storing a target value of the size of the specific object, a control unit performing auto zoom control that automatically provides a zoom operation to make the size of the specific object equal or closer to the target value, and a position detection unit detecting a position of the specific object in the image. The control unit controls, in the auto zoom control, a speed of the zoom operation depending on the position of the specific object detected by the position detection unit. The apparatus can prevent easy disappearance of the specific object from the image when the auto zoom operation is performed.

12 Claims, 8 Drawing Sheets

IMAGE PICKUP APPARATUS HAVING AN AUTO ZOOM FUNCTION AND METHOD FOR CONTROLLING IMAGE PICKUP APPARATUS

BACKGROUND OF THE INVENTION

1. Field of the Invention

The present invention relates to an image pickup apparatus such as a digital still camera and a digital video camera, and particularly to an image pickup apparatus having an auto zoom function capable of automatically keeping a constant size of an object in a captured image.

2. Description of the Related Art

Some image pickup apparatuses have a so-called auto zoom function (hereinafter simply referred to as "auto zoom") that automatically performs zooming, when the image pickup apparatus is aimed at an object, so as to obtain image magnifications preset according to object distances. For example, Japanese Patent Laid-Open NO. 06-153047 discloses a camera that compares an area of a person's face detected in a captured image with a reference area and automatically performs zooming so as to always make the area of the face equal to the reference area.

Moreover, Japanese Patent Laid-Open NO. 2003-107335 discloses an image pickup apparatus that detects a person's face in a captured image, displays a focus detection area including the face and performs autofocus on the face in that focus detection area. This image pickup apparatus detects the person's face from the entire captured image, which can perform a good autofocus operation on the face regardless of a position and a region (size) of the person in the captured image.

Figure 8A:
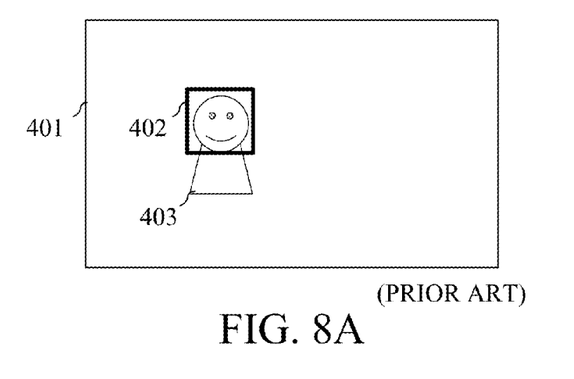
FIGS. 8A to 8C show a problem in a conventional auto zoom function.
Figure 8B:
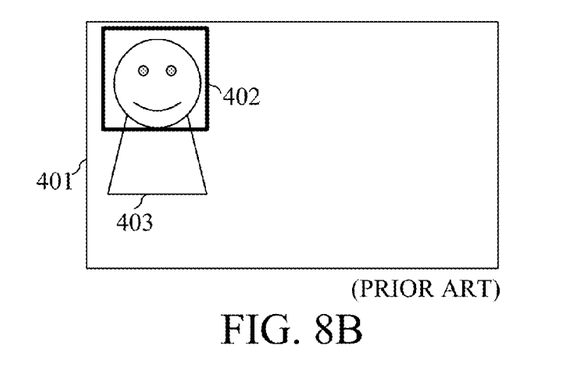

However, in the camera disclosed in Japanese Patent Laid-Open NO. 06-153047, performing the auto zoom for the detected face without aiming direction change of the camera may cause disappearance of the face from the captured image. The possibility of such disappearance increases as a position of the face becomes farther from a center of the captured image (image pickup region). For example, FIG. 8A shows a case where an object 403 is located away from a center of a captured image 401. Reference numeral 402 denotes a face frame showing a region including a face of the object 403. In this case, performing zooming in a telephoto direction moves the object outward in the captured image 401 while increasing the size of the object 403 as shown in FIG. 8B.

Figure 8C:
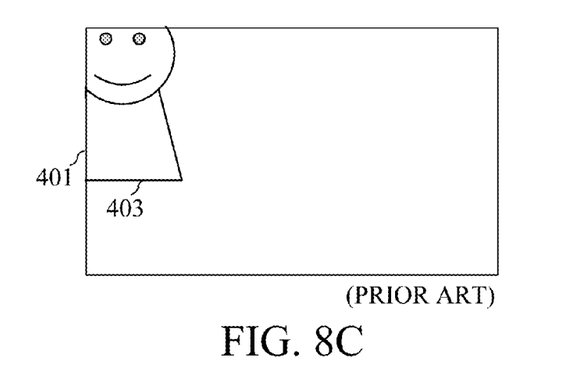

Then, continuing the zooming in the telephoto direction finally moves the object 403 out of the image 401 as shown in FIG. 8C. This makes it difficult to recognize the object 403 from the captured image 401, and causes disappearance of the face frame 402.

It is possible to place the object at the center of the captured image by user's camera work. However, in particular, a fast zoom speed of the auto zoom often causes disappearance of the object within a short time.

Thus, the auto zoom causing such rapid disappearance of the object from the captured image causes the camera to repeat operation and stop of the zooming and to perform further zooming though the face has been already disappeared from the captured image.

SUMMARY OF THE INVENTION

The present invention provides an image pickup apparatus capable of preventing easy disappearance of the object from the captured image due to the auto zoom function.

The Present invention provides as one aspect thereof an image pickup apparatus including an image pickup unit configured to photoelectrically convert an object image formed by an image taking optical system, an image production unit configured to produce an image by using an output signal from the image pickup unit, a size detection unit configured to detect a size of a specific object in the image, a storage unit configured to store a target value of the size of the specific object, a control unit configured to perform auto zoom control that automatically provides a zoom operation to make the size of the specific object equal or closer to the target value, and a position detection unit configured to detect a position of the specific object in the image. The control unit is configured to control, in the auto zoom control, a speed of the zoom operation depending on the position of the specific object detected by the position detection unit.

The present invention provides as another aspect thereof a method for controlling an image pickup apparatus including an image pickup unit configured to photoelectrically convert an object image formed by an image taking optical system and an image production unit configured to produce an image by using an output signal from the image pickup unit. The method includes a detection step of detecting a size of a specific object in the image and a position of the specific object in the image, and a control step of performing auto zoom control that automatically provides a zoom operation to make the size of the specific object equal or closer to a target value stored in a storage unit. In the auto zoom control performed in the control step, a speed of the zoom operation is controlled depending on the position of the specific object detected by the position detection unit.

The present invention provides as still another aspect thereof a computer readable storage medium storing a computer program that causes an image pickup apparatus to perform operations. The image pickup apparatus includes an image pickup unit configured to photoelectrically convert an object image formed by an image taking optical system and an image production unit configured to produce an image by using an output signal from the image pickup unit. The operations includes detecting a size of a specific object in the image and a position of the specific object in the image, and performing auto zoom control that automatically provides a zoom operation to make the size of the specific object equal or closer to a target value stored in a storage unit. In the auto zoom control, a speed of the zoom operation is controlled depending on the position of the specific object detected by the position detection unit.

Other aspects of the present invention will become apparent from the following description and the attached drawings.

DESCRIPTION OF THE EMBODIMENTS

Figure 1:
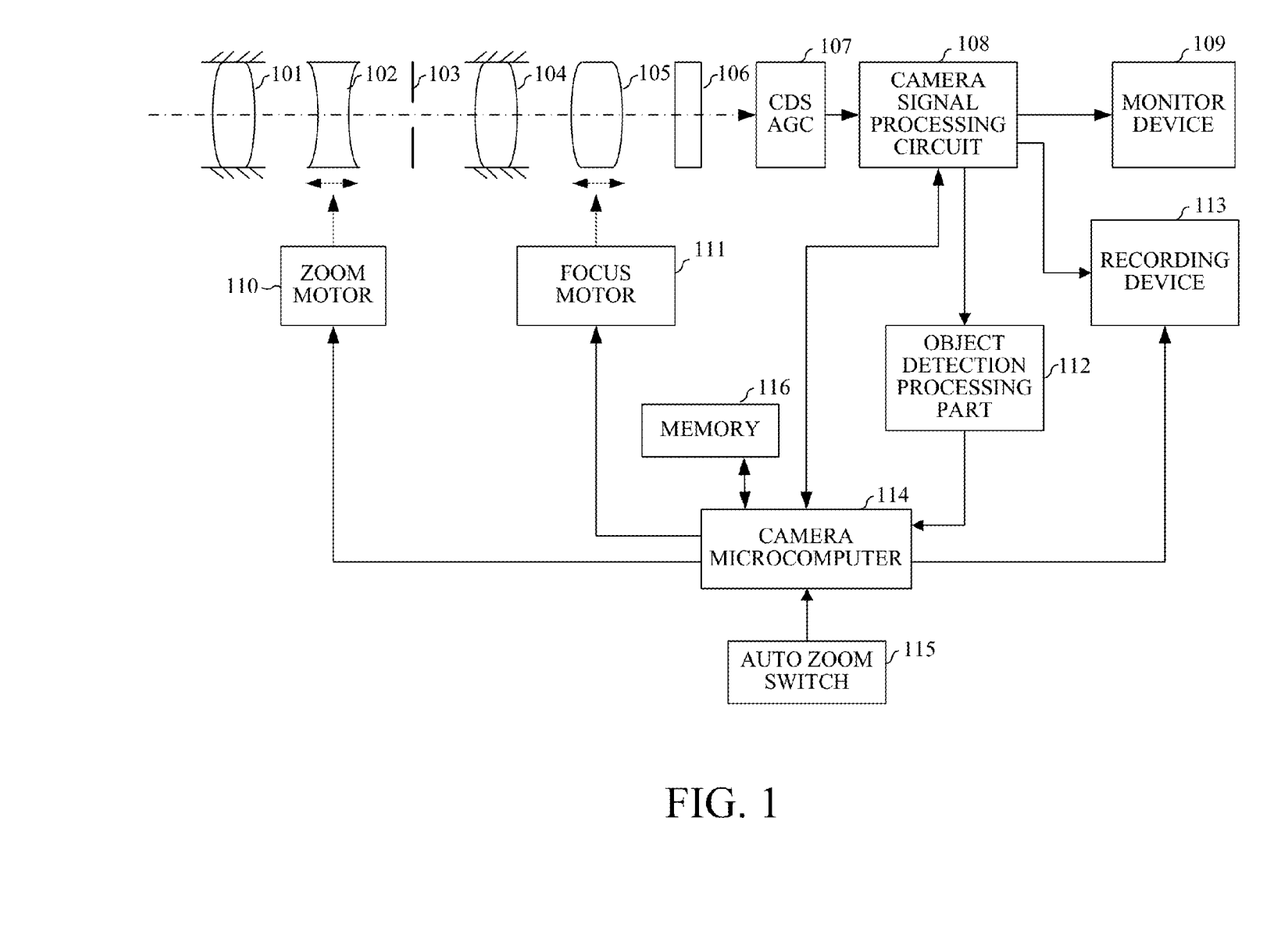
FIG. 1 is a block diagram showing the configuration of an image pickup apparatus that is Embodiment 1 of the present invention.

FIG. 1 shows the configuration of a video camera as an image pickup apparatus that is a first embodiment (Embodiment 1) of the present invention. Although this embodiment will describe the video camera, alternative embodiments of the present invention include a digital still camera having a video capturing function.

Reference numeral 101 denotes a first lens unit that is a fixed lens unit, and reference numeral 102 denotes a second lens unit that moves in an optical axis direction to perform variation of magnification (optical zoom operation). The second lens unit 102 is hereafter referred to as a "magnification-varying lens".

Reference numeral 103 denotes an aperture stop. Reference numeral 104 denotes a third lens unit that is a fixed lens unit. Reference numeral 105 denotes a focus compensator lens unit (hereinafter referred to as a "focus lens") that moves in the optical axis direction to correct image plane variation caused by the variation of magnification and to perform focusing. These lens units 101, 102, 104 and 105 and the aperture stop 103 constitute an image taking optical system.

Reference numeral 106 denotes an image pickup element as an image pickup unit that is constituted by a photoelectric conversion element such as a CCD sensor or a CMOS sensor and photoelectrically converts an object image formed by the image taking optical system. Reference numeral 107 denotes a CDS/AGC that performs sampling of an output signal from the image pickup element 106 to adjust a gain thereof. Reference numeral 108 denotes a camera signal processing circuit (image production unit) that performs various image processing on an output signal from the CDS/AGC 107 to produce a video signal (captured image or image data).

Reference numeral 109 denotes a monitoring device that constitutes a display unit. The monitoring device 109 displays the video signal (captured image) produced by the camera signal processing circuit 108, information showing states of the camera and various warnings. Reference numeral 113 denotes a recording device that records the video signal (captured image) produced by the camera signal processing circuit 108 to a recording medium such as an optical disk or a semiconductor memory.

Reference numeral 110 denotes a zoom motor that is a driving source to move the magnification-varying lens 102. Reference numeral 111 denotes a focus motor that is a driving source to move the focus lens 105. These motors 110 and 111 are driven in response to a driving instruction from a camera microcomputer 114 to move the corresponding lenses 102 and 105.

Reference numeral 112 denotes an object detection processing part serving as a position detection unit and a size detection unit. The object detection processing part 112 performs an object detection process described later on the video signal (captured image) to detect an object region in the captured image. Moreover, the object detection processing part 112 calculates feature amounts of a specific object (that is, a specific object image) included in the object region. The feature amounts include a position and a size (such as a length or an area) of the specific object. The object detection processing part 112 sends the feature amounts of the specific object to the camera microcomputer 114.

Methods particularly for detecting a person's face (specific object) in a captured image, which are used in the object detection process, include the following ones as examples:

(1) a method of extracting a skin color region from colors (tones) of pixels constituting the captured image, and detecting the face depending on a matching degree of the skin color region with a face outline plate that is prepared beforehand; and (2) a method of extracting face feature parts such as eyes, a nose and a mouth from the captured image by using a pattern recognition technology to detect the face.

This embodiment can use any one of the above two methods (1) and (2) in the object detection process, and may use other methods. Moreover, the specific object may be an object other than the person's face. In addition, a method may be used which provides an object specifying unit for enabling a user to specify the specific object and detects an object region including the specific object from luminance information or color information of the specific object in a captured image by using a pattern matching technology.

The camera microcomputer (control unit) 114 governs control of all operations of the video camera, and controls a position of the magnification-varying lens 102 through a auto zoom function performing auto zoom control. Reference numeral 115 denotes an auto zoom switch that is operated by a user to turn the auto zoom function on (active) and off (non-active).

Reference numeral 116 denotes a memory (storage unit) that is constituted by a DRAM, a flash ROM or the like, and stores computer programs and data used in various processes performed by the camera microcomputer 114, the processes including the auto zoom control. The memory 116 also stores data of a reference size as a target value used for keeping a size of the specific object in the auto zoom control.

Next, description will be made of the auto zoom control (hereinafter simply referred to as "auto zoom") performed by the camera microcomputer 114 with reference to a flowchart shown in FIG. 2.

At step S201, the camera microcomputer 114 determines on/off of the auto zoom (that is, whether the auto zoom switch 115 is turned on or off). If determining that the auto zoom is off (non-active), the camera microcomputer 114 proceeds to step S212 to perform normal camera processes. On the other hand, if determining that the auto zoom is on (active), the camera microcomputer 114 proceeds to step S202.

At step S202, the camera microcomputer 114 acquires, from the object detection processing part 112, coordinates P(X,Y) showing a current position of the specific object (hereinafter also simply referred to as an "object") that is a target object in the auto zoom in the captured image and a current size S of the object. Although the origin for P(X,Y) may be arbitrarily set, this embodiment sets it to a center of the captured image.

Next, at step S203, the camera microcomputer 114 acquires a current position of the magnification-varying lens 102, and stores it as a zoom position Z in a memory (not shown and hereinafter referred to as an "internal memory") provided in the camera microcomputer 114. The position of the magnification-varying lens 102 can be acquired by using a position sensor, such as an encoder or a potentiometer, which outputs a signal corresponding to the position of the magnification-varying lens 102. In a case where the zoom motor 110 is a stepping motor, the position of the magnification-varying lens 102 can be acquired by using a counted value of the number of driving pulses input to the zoom motor 110.

Next, at step S204, the camera microcomputer 114 acquires a predetermined size (hereinafter referred to as a "reference size") S0 of the object that should be kept by the auto zoom from the memory 116.

Next, at step S205, the camera microcomputer 114 stores an absolute value of a difference between the current size S of the object and the reference size S0 as a variable DIFF in the internal memory. Then, the camera microcomputer 114 proceeds to step S206 to determine whether or not the variable DIFF is larger than a predetermined value (hereinafter referred to as a "threshold") TH.

The threshold TH is provided for preventing the magnification-varying lens 102 being continuously and minutely moved by the auto zoom when the size S of the object is minutely changed due to detection errors in the object detection processing part 112 or the like. That is, the threshold TH is provided for allowing the auto zoom to be activated when the difference between the current size S of the object and the reference size S0 increases to some extent. The threshold TH may be a fixed value, and may be defined as a ratio to the size S of the object, such as 10% of the size S. Moreover, the threshold TH may be changed depending on a zoom magnification. The camera microcomputer 114 proceeds to step S207 if the variable DIFF is larger than the threshold TH, and proceeds to step S212 if the variable DIFF is equal to or smaller than the threshold TH.

At step S207, the camera microcomputer 114 determines whether or not the difference between the the current size S of the object and the reference size S0 is positive (S−S0>0). If it is positive, the camera microcomputer 114 proceeds to step S208 to set a driving direction of the magnification-varying lens 102 to a wide-angle direction in order to move the magnification-varying lens 102 in a direction where the face in the captured image is reduced in size. Then, the camera microcomputer 114 proceeds to step S209. On the other hand, if the difference between the current size S of the object and reference size S0 is negative (S−S0<0), the camera microcomputer 114 proceeds to step S213 to set the driving direction of the magnification-varying lens 102 to a telephoto direction in order to move the magnification-varying lens 102 in a direction where the face in the captured image is increased in size. Then, the camera microcomputer 114 proceeds to step S209.

At step S209, the camera microcomputer 114 performs a process to set a driving speed of the magnification-varying lens 102, that is, a zoom speed in the auto zoom. A detailed description of this zoom speed setting process will be made later. After performing the zoom speed setting process at step S209, the camera microcomputer 114 proceeds to step S210 to perform a process to move the magnification-varying lens 102 at the driving speed set at step S209. Thus, a zoom operation by the auto zoom is performed so as to make the size of the object equal or closer to the reference size (target value). The size close (closer) to the reference size means that, for example, the size is included within a range having a slight difference from the reference size.

Figure 3:
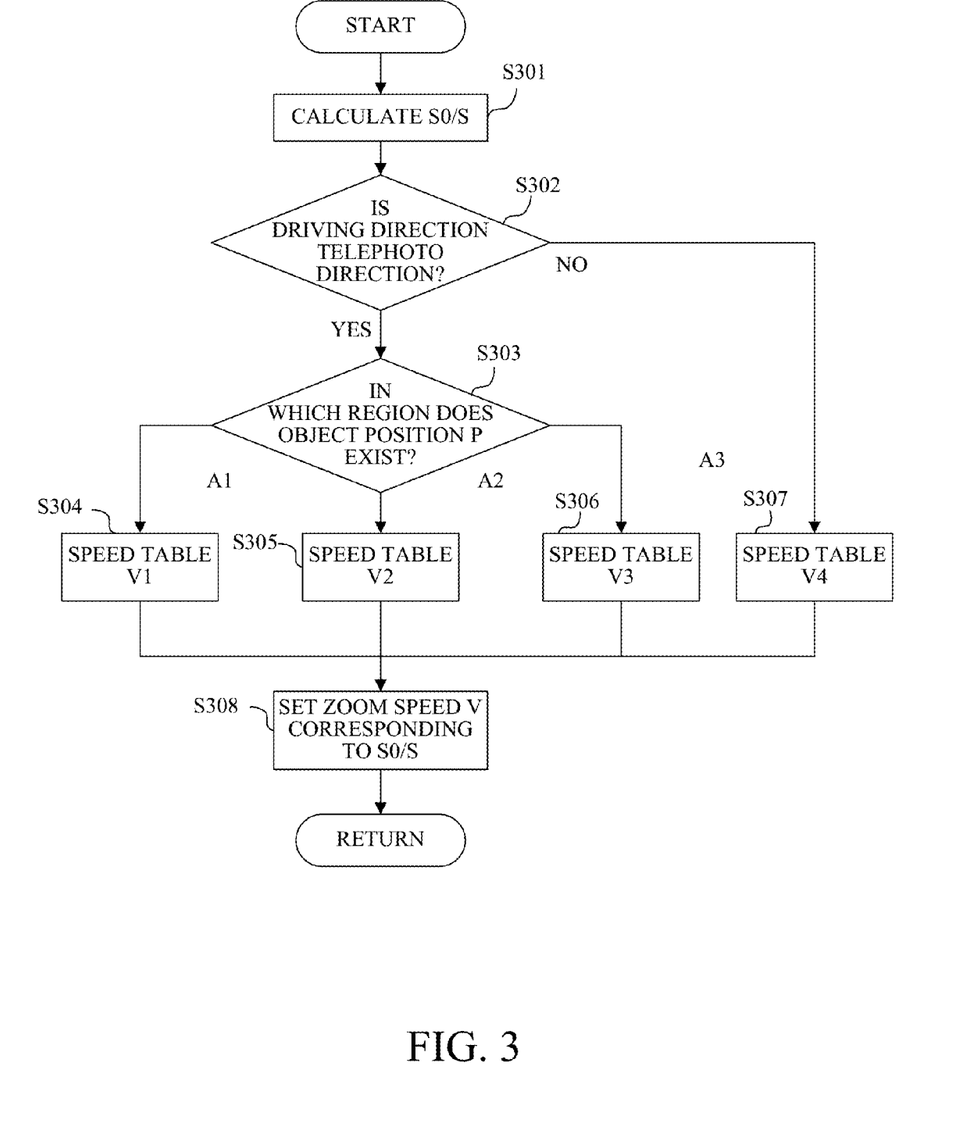
FIG. 3 is a flowchart showing a zoom speed setting process in the image pickup apparatus of Embodiment 1.

Next, description will be made of the zoom speed setting process for setting the driving speed of the magnification-varying lens 102 in the auto zoom with reference to a flowchart shown in FIG. 3.

First at step S301, the camera microcomputer 114 calculates S0/S that is a ratio of the reference size S0 and the current size S of the object. Then, the camera microcomputer 114 proceeds to step S302.

At step S302, the camera microcomputer 114 determines whether or not the driving direction of the magnification-varying lens 102 set at step S208 or step S213 is the telephoto direction. If the driving direction is the telephoto direction, the camera microcomputer 114 proceeds to step S303, and if the driving direction is not the telephoto direction (that is, if the driving direction is the wide-angle direction), the camera microcomputer 114 proceeds to step S307.

At step S303, the camera microcomputer 114 determines in which region the target object in the auto zoom exists in the captured image, and sets a speed table to drive the magnification-varying lens 102 at the subsequent process (step S210) according to the determination result. The speed table will be described later.

Figure 4A:
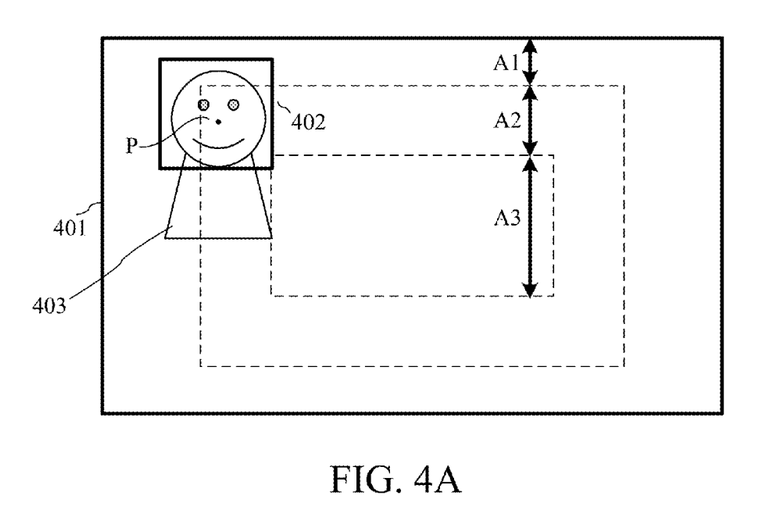
FIG. 4A shows regions divided in a captured image in Embodiment 1.

For example, FIG. 4A shows a case where a captured image 401 is divided into three regions A1, A2 and A3 in order from an outermost region (from a farthest region from the center of the captured image 401). Reference numeral 402 denotes a face frame that surrounds a face that is the specific object (target object) and is displayed on the monitor device 109 with the captured image 401. A position at which the face (face frame 402) exists is hereinafter referred to as an "object position P". Reference numeral 403 denotes a person having the face 402.

If determining that the object position P is included in the region A1 at step S303, the camera microcomputer 114 proceeds to step S304 to set a speed table V1 to drive the magnification-varying lens 102. Similarly, if determining that the object position P is included in the region A2, the camera microcomputer 114 proceeds to step S305 to set a speed table V2. In addition, if determining that the object position P is included in the region A3, the camera microcomputer 114 proceeds to step S306 to set a speed table V3. The camera microcomputer 114 proceeds to step S308 from steps S304, S305 and S306.

When the camera microcomputer 114 proceeds from step S302 to step S307 because the driving direction of the magnification-varying lens 102 is the wide-angle direction, the camera microcomputer 114 sets a speed table V4, and then proceeds to step S308.

At step S308, the camera microcomputer 114 sets the driving speed V of the magnification-varying lens 102 (zoom speed) corresponding to the ratio S0/S calculated at step S301 in one of the speed tables V1 to V4 set at steps S304 to S307 corresponding to the region including the object position P. Thus, the camera microcomputer 114 ends the zoom speed setting process in the auto zoom.

Figure 4B:
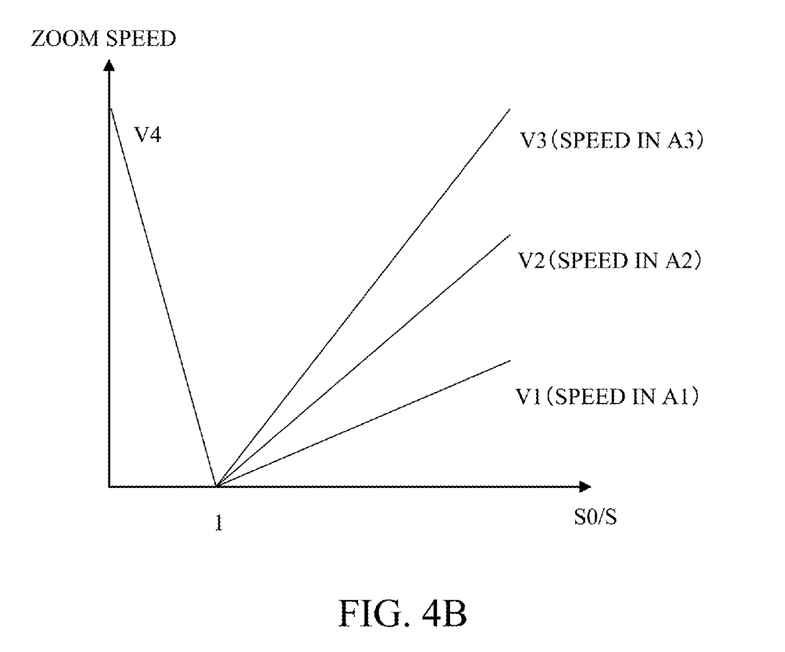
FIG. 4B shows a relationship between a ratio S0/S and a zoom speed in Embodiment 1.

Description will be made of the speed table with reference to an example shown in FIG. 4B. FIG. 4B shows a relationship of the ratio S0/S calculated at step S301 and shown along a horizontal axis and the driving speeds of the magnification-varying lens 102 shown along a vertical axis. When the ratio S0/S is larger than 1, the magnification-varying lens 102 is driven in the telephoto direction according to one of the speed tables V1 to V3. When the ratio S0/S is smaller than 1, the magnification-varying lens 102 is driven in the wide-angle direction according to the speed table V4.

In a range where the ratio S0/S is larger than 1, the driving speeds according to the speed tables V1 to V3 when the ratio S0/S is fixed have the following relationship where speed-i (i=1, 2, 3) represents the driving speed according to the speed table Vi:

speed-1<speed-2<speed-3.

The speed tables V1, V2 and V3 for setting the driving speed of the magnification-varying lens 102 are respectively used in the regions A1, A2 and A3 in the captured image. Therefore, the driving speed of the magnification-varying lens 102 (zoom speed) is decreased as the position of the target object in the auto zoom becomes farther from the center of the captured image (that is, the object position becomes closer to an outermost edge of the captured image). Moreover, the driving speed of the magnification-varying lens 102 is increased as the ratio S0/S becomes larger from 1.

On the other hand, when the ratio S0/S calculated at step S301 is smaller than 1, that is, when the magnification-varying lens 102 is driven in the wide-angle direction, regardless of the position of the target object in the auto zoom, the object is never moved out of the captured image. Therefore, the driving speed of the magnification-varying lens 102 (zoom speed) is set to a high speed according to the speed table V4. Moreover, the driving speed of the magnification-varying lens 102 is increased as the ratio S0/S becomes smaller from 1.

This embodiment described an example in which the ratio S0/S and the driving speed of the magnification-varying lens 102 have a linear functional relationship. However, the ratio S0/S and the driving speed of the magnification-varying lens 102 have an exponential functional relationship as long as they have a monotonous increasing functional relationship in the range where the ratio S0/S is larger than 1 and have a monotonous decreasing functional relationship in the range where the ratio S0/S is smaller than 1.

Embodiment 2

Next, description will be made of a video camera that is a second embodiment (Embodiment 2) of the present invention. The configuration of the video camera of this embodiment is same as that of the video camera of Embodiment 1 shown in FIG. 1, so that description thereof is omitted. Components in this embodiment identical to those in Embodiment 1 are denoted by the same reference numerals as those in Embodiment 1. Moreover, the auto zoom in this embodiment is same as that of Embodiment 1 shown by using the flowchart of FIG. 2 except the process for setting the driving speed of the magnification-varying lens 102, so that description of the same part is also omitted.

Figure 5:
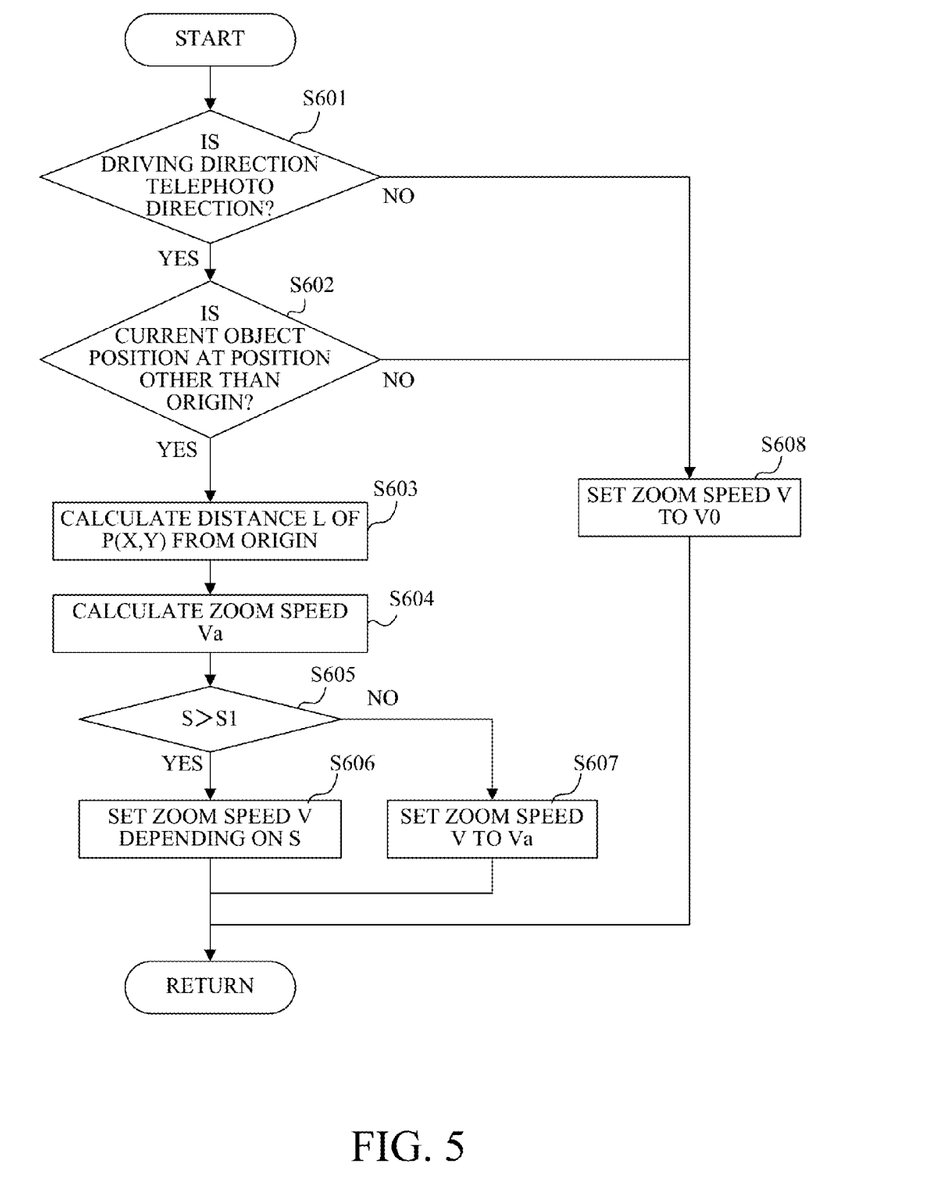
FIG. 5 is a flowchart showing a zoom speed setting process in an image pickup apparatus that is Embodiment 2 of the present invention.

FIG. 5 shows a procedure of a zoom speed setting process for setting the driving speed of the magnification-varying lens 102 in the auto zoom in this embodiment.

Figure 2:
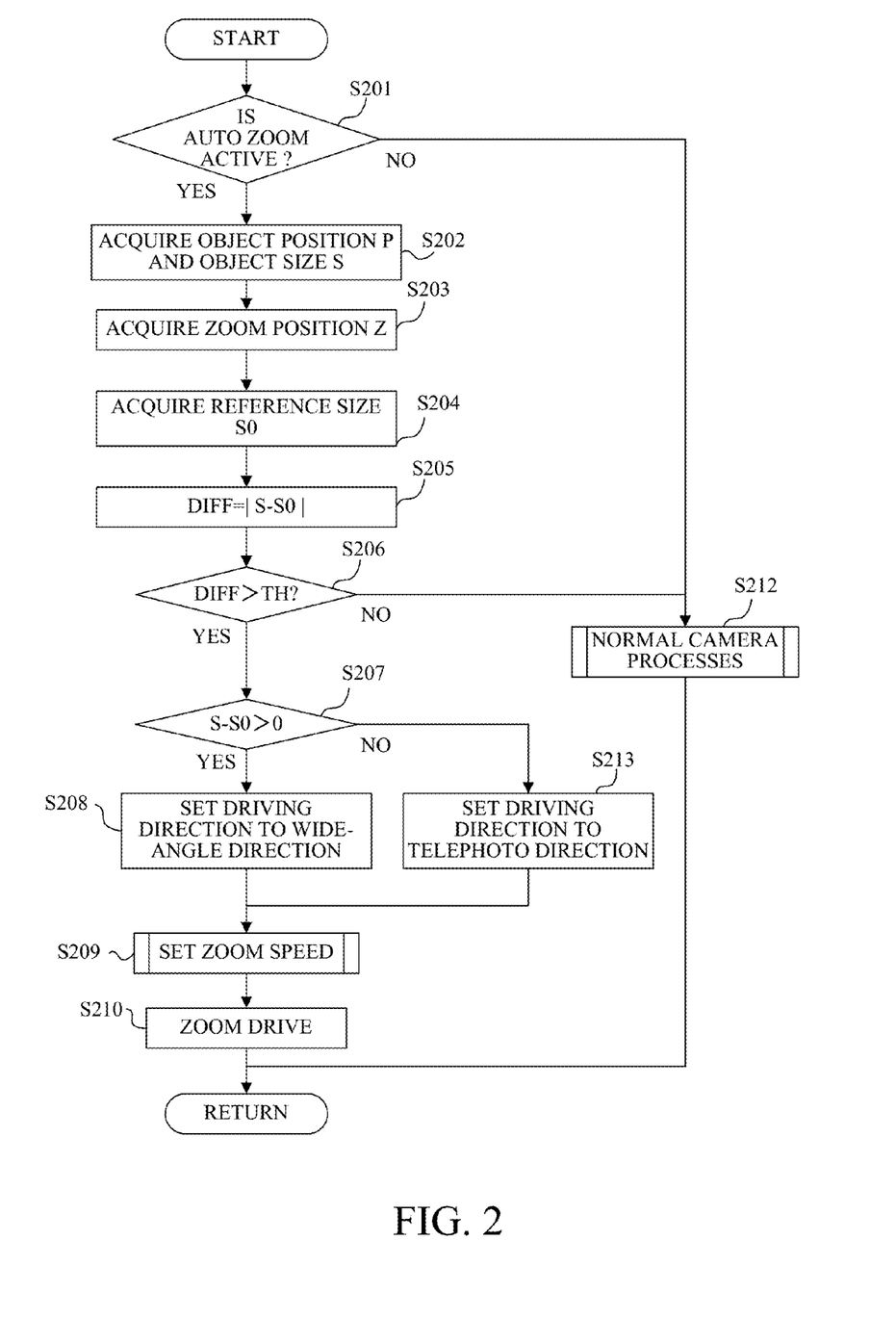
FIG. 2 is a flowchart showing a procedure of auto zoom control in the image pickup apparatus of Embodiment 1.

First at step S601, the camera microcomputer 114 determines whether or not the driving direction of the magnification-varying lens 102 set at step S208 or step S213 in the flowchart of FIG. 2 is the telephoto direction. If the driving direction is the telephoto direction, the camera microcomputer 114 proceeds to step S602, and if the driving direction is not the telephoto direction (that is, if the driving direction is the wide-angle direction), the camera microcomputer 114 proceeds to step S608.

At step S602, the camera microcomputer 114 determines whether or not the current object position is a position other than an origin O. The origin O is the center of the captured image in this embodiment. If the current object position is the position other than the origin O, the camera microcomputer 114 proceeds to step S603. If the current object position is at the origin O, the camera microcomputer 114 proceeds to step S608.

Figure 6A:
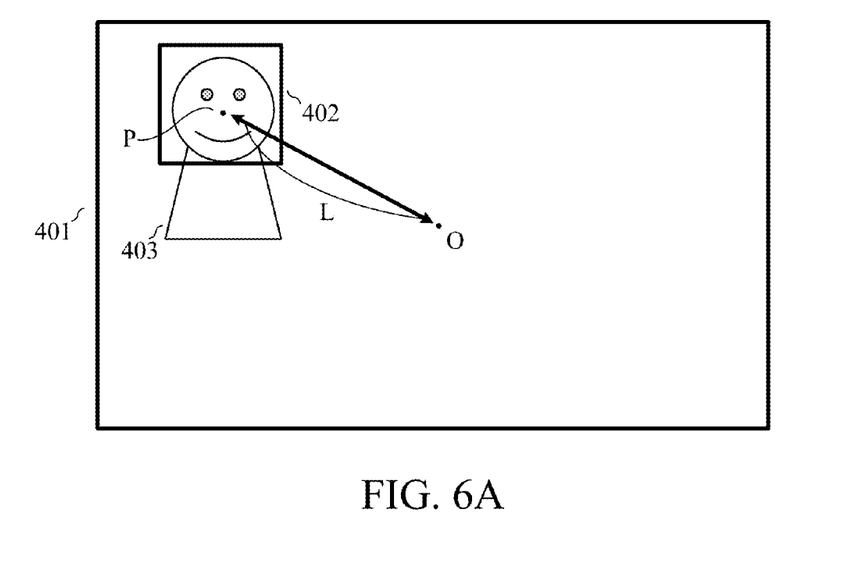
FIG. 6A shows a distance of an object from a center of a captured image in Embodiment 2.

At step S603, the camera microcomputer 114 calculates a distance L of the coordinates P(X,Y) from the origin O by using the following expression 1. The coordinates P(X,Y) show the object position acquired through the object detection processing part 112 at step S202 in FIG. 2. FIG. 6A shows an example of the distance L. Reference numeral 402 denotes a face frame that surrounds a face that is the specific object and is displayed on the monitor device 109 with the captured image 401. Reference numeral 403 denotes a person having the face 402. Then, the camera microcomputer 114 proceeds to step S604.

$$L=\sqrt{X^2+Y^2} \quad \text{(Expression 1)}$$

At step S604, the camera microcomputer 114 decides a driving speed Va of the magnification-varying lens 102 (zoom speed) in the auto zoom. In a case where a driving speed of the magnification-varying lens 102 when the object exists at the origin O is defined as V0, the driving speed Va (<V0) of the magnification-varying lens 102 in the auto zoom when the distance between the object position and the origin O is denoted by L is obtained by the following expression 2:

$$Va=V0/L (L>0) \quad \text{(Expression 2)}$$

Figure 6B:
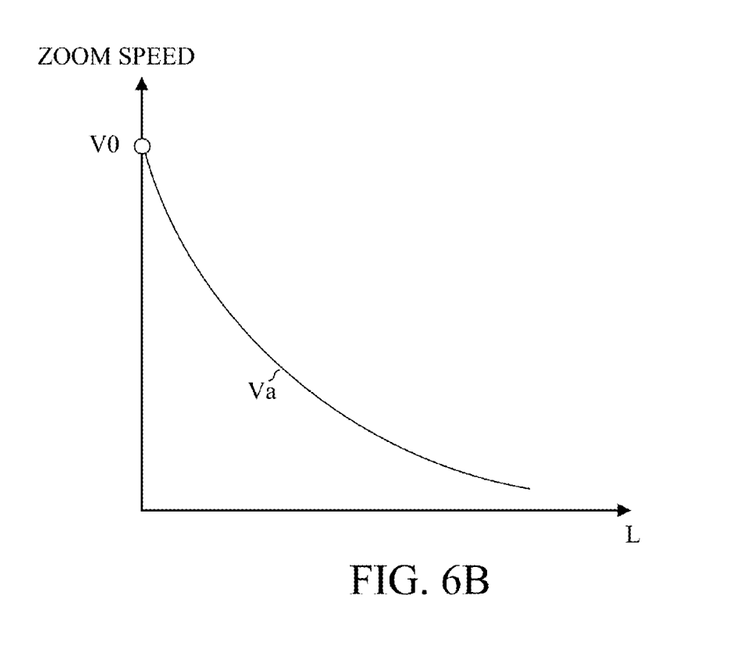
FIG. 6B shows a relationship between the distance and a zoom speed in Embodiment 2.

FIG. 6B shows the driving speed Va of the magnification-varying lens 102 (zoom speed) which is calculated according to the expression 2. A horizontal axis shows the distance L from the object position (coordinates) P to the origin O as shown in FIG. 6A, and a vertical axis shows the driving speed Va of the magnification-varying lens 102 (zoom speed). As understood from FIG. 6B, the driving speed Va of the magnification-varying lens 102 is decreased as the distance L increases, that is, as the position of the target object in the auto zoom becomes closer to an outermost edge of the captured image 401 (that is, as the position of the target object becomes farther from the center of the captured image 401). In other words, the driving speed Va of the magnification-varying lens 102 is increased as the distance L decreases, that is, as the position of the target object becomes closer to the center of the captured image 401

Next, at steps S605 and S606, the camera microcomputer 114 sets the driving speed of the magnification-varying lens 102 depending on the size of the object. First at step S605, the camera microcomputer 114 determines whether or not the size (hereinafter referred to as a "detected object size") S of the target object in the auto zoom is larger than a predetermined object size S1. If the detected object size S is larger than the predetermined object size S1, the camera microcomputer 114 proceeds to step S606. If the detected object size S is equal to or smaller than the predetermined object size S1, the camera microcomputer 114 proceeds to step S607.

Figure 7:
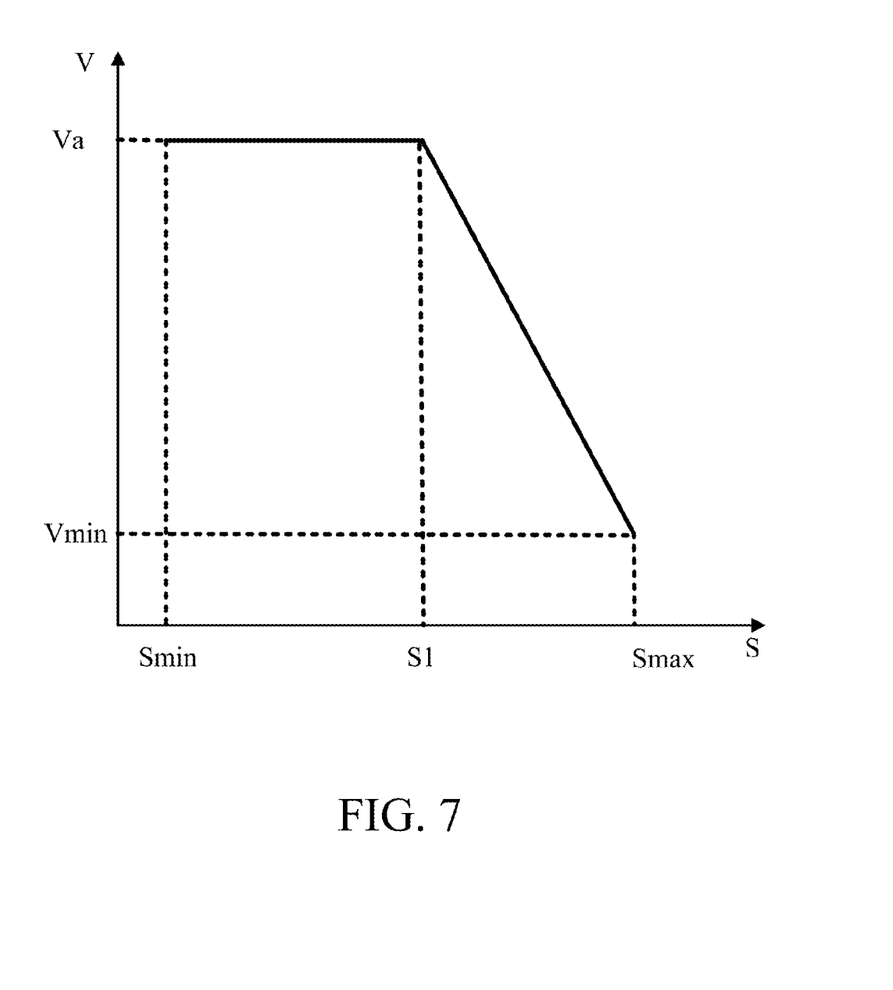
FIG. 7 shows a relationship between a size of the object and the zoom speed in Embodiment 2.

FIG. 7 shows the driving speed V of the magnification-varying lens 102 set depending on the detected object size S when Smin shows a minimum detected object size and Smax shows a maximum detected object size. At step S606, the camera microcomputer 114 sets the driving speed V of the magnification-varying lens 102 using the following expression 3:

$$V=(Va-V\min)\times(S-S1)/(S1-S\max)+Va \quad \text{(Expression 3)}$$

where Vmin (<Va) represents a driving speed for Smax and the following relationship is established:

$$S1<S<S\max.$$

Moreover, at step S607, the camera microcomputer 114 sets the driving speed of the magnification-varying lens 102 using the following expression 4:

$$V=Va \quad \text{(Expression 4)}$$

Thus, when the detected object size S is equal to or smaller than the predetermined object size S1, the driving speed Va calculated at step S604 is set as the driving speed V of the magnification-varying lens 102. On the other hand, when the detected object size S is larger than the predetermined object size S1, the driving speed V of the magnification-varying lens 102 is decreased as the detected object size S becomes larger.

At step S608, the camera microcomputer 114 sets the driving speed V of magnification-varying lens 102 to V0. However, when proceeding from step S602 to step S608, the camera microcomputer 114 may set the driving speed V to a constant speed different from V0.

As described above, each embodiment decreases the zoom speed as the position of the specific object that is the auto zoom target object in the captured image becomes farther from the center of the captured image. Such setting of the zoom speed enables prevention of disappearance of the specific object from the captured image due to the auto zoom. Therefore, each embodiment can solve the problem of causing the video camera to repeat operation and stop of zooming and to perform further zooming though the specific object has been already disappeared from the captured image.

Although each embodiment described the case where the zoom speed of the optical zoom operation is varied depending on the position and size of the specific object in the captured image, a zoom speed of an electronic zoom operation that electronically enlarges part of the captured image may be similarly varied. Furthermore, a zoom speed of a zoom operation performed by a combination of the optical zoom operation and the electronic zoom operation may be similarly varied. That is, embodiments of the present invention include image pickup apparatuses capable of performing at least one of the optical zoom operation and the electronic zoom operation.

Moreover, although each embodiment described the image pickup apparatus integrally provided with the image taking optical system, alternative embodiments of the present invention include an image pickup apparatus in which the image taking optical system is interchangeable.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions. This application claims the benefit of Japanese Patent Application No. 2010-132958, filed on Jun. 10, 2010, which is hereby incorporated by reference herein in its entirety.

What is claimed is:

1. An image pickup apparatus comprising:
an image pickup unit configured to photoelectrically convert an object image formed by an image taking optical system;
an image production unit configured to produce an image by using an output signal from the image pickup unit;
a size detection unit configured to detect a size of a specific object in the image;
a storage unit configured to store a target value of the size of the specific object;
a control unit configured to perform auto zoom control that automatically provides a zoom operation to make the size of the specific object equal or closer to the target value; and
a position detection unit configured to detect a position of the specific object in the image,
wherein the control unit is configured to decrease, in the auto zoom control, a speed of the zoom operation as the position of the specific object detected by the position detection unit becomes farther from a center of the image.

2. An image pickup apparatus according to claim 1, wherein the control unit is configured to decrease, in the auto zoom control, the speed of the zoom operation as the size of the specific object detected by the size detection unit becomes larger.

3. An image pickup apparatus according to claim 1, wherein the control unit is configured to set, in the auto zoom control, the speed of the zoom operation to a constant speed when the zoom operation is performed in a wide-angle direction.

4. An image pickup apparatus according to claim 1, wherein the zoom operation is performed by at least one of an optical zoom operation of the image taking optical system and an electronic zoom operation using the image.

5. A method for controlling an image pickup apparatus including an image pickup unit configured to photoelectrically convert an object image formed by an image taking optical system and an image production unit configured to produce an image by using an output signal from the image pickup unit, the method comprising:
a detection step of detecting a size of a specific object in the image and a position of the specific object in the image; and
a control step of performing auto zoom control that automatically provides a zoom operation to make the size of the specific object equal or closer to a target value stored in a storage unit,
wherein, in the auto zoom control performed in the control step, a speed of the zoom operation is decreased as the position of the specific object detected in the detection step becomes farther from a center of the image.

6. A non-transitory computer readable storage medium storing a computer program that causes an image pickup apparatus to perform operations, the image pickup apparatus including an image pickup unit configured to photoelectrically convert an object image formed by an image taking optical system and an image production unit configured to produce an image by using an output signal from the image pickup unit, the operations comprising:
detecting a size of a specific object in the image and a position of the specific object in the image; and
performing auto zoom control that automatically provides a zoom operation to make the size of the specific object equal or closer to a target value stored in a storage unit,
wherein, in the auto zoom control, a speed of the zoom operation is decreased as the position of the specific object detected by the detection unit becomes farther from a center of the image.

7. An image pickup apparatus comprising:
an image pickup unit configured to photoelectrically convert an object image formed by an image taking optical system;
an image production unit configured to produce an image by using an output signal from the image pickup unit;
a size detection unit configured to detect a size of a specific object in the image;
a storage unit configured to store a target value of the size of the specific object;
a control unit configured to perform auto zoom control that automatically provides a zoom operation to make the size of the specific object equal or closer to the target value; and
a position detection unit configured to detect a position of the specific object in the image,
wherein the control unit is configured to control, in the auto zoom control, a speed of the zoom operation so that a first speed of the zoom operation in case where the specific object is at a first position is slower than a second speed of the zoom operation in case where the specific object is at a second position which is closer to a center of the image than the first position.

8. An image pickup apparatus according to claim 7, wherein the control unit is configured to decrease, in the auto zoom control, the speed of the zoom operation as the size of the specific object detected by the size detection unit becomes larger.

9. An image pickup apparatus according to claim 7, wherein the control unit is configured to set, in the auto zoom control, the speed of the zoom operation to a constant speed when the zoom operation is performed in a wide-angle direction.

10. An image pickup apparatus according to claim 7, wherein the zoom operation is performed by at least one of an optical zoom operation of the image taking optical system and an electronic zoom operation using the image.

11. A method for controlling an image pickup apparatus including an image pickup unit configured to photoelectrically convert an object image formed by an image taking optical system and an image production unit configured to produce an image by using an output signal from the image pickup unit, the method comprising:
 a detection step of detecting a size of a specific object in the image and a position of the specific object in the image; and
 a control step of performing auto zoom control that automatically provides a zoom operation to make the size of the specific object equal or closer to a target value stored in a storage unit,
 wherein, in the auto zoom control performed in the control step, a speed of the zoom operation is controlled so that a first speed of the zoom operation in case where the specific object is at a first position is slower than a second speed of the zoom operation in case where the specific object is at a second position which is closer to a center of the image than the first position.

12. A non-transitory computer readable storage medium storing a computer program that causes an image pickup apparatus to perform operations, the image pickup apparatus including an image pickup unit configured to photoelectrically convert an object image formed by an image taking optical system and an image production unit configured to produce an image by using an output signal from the image pickup unit, the operations comprising:
 detecting a size of a specific object in the image and a position of the specific object in the image; and
 performing auto zoom control that automatically provides a zoom operation to make the size of the specific object equal or closer to a target value stored in a storage unit,
 wherein, in the auto zoom control, a speed of the zoom operation is controlled so that a first speed of the zoom operation in case where the specific object is at a first position is slower than a second speed of the zoom operation in case where the specific object is at a second position which is closer to a center of the image than the first position.

* * * * *